United States Patent
Fukuda et al.

(10) Patent No.: US 10,460,723 B2
(45) Date of Patent: *Oct. 29, 2019

(54) SOUND IDENTIFICATION UTILIZING PERIODIC INDICATIONS

(71) Applicant: INTERNATIONAL BUSINESS MACHINES CORPORATION, Armonk, NY (US)

(72) Inventors: Takashi Fukuda, Tokyo (JP); Osamu Ichikawa, Tokyo (JP); Bhuvana Ramabhadran, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/992,778

(22) Filed: May 30, 2018

(65) Prior Publication Data

US 2018/0277104 A1    Sep. 27, 2018

Related U.S. Application Data

(63) Continuation of application No. 15/441,973, filed on Feb. 24, 2017, now Pat. No. 10,062,378.

(51) Int. Cl.
*G10L 15/00* (2013.01)
*G10L 15/16* (2006.01)
(Continued)

(52) U.S. Cl.
CPC .............. *G10L 15/16* (2013.01); *G10L 15/02* (2013.01); *G10L 15/063* (2013.01); *G10L 25/24* (2013.01); *G10L 2015/025* (2013.01)

(58) Field of Classification Search
CPC ........................................................ G10L 15/00
(Continued)

(56) References Cited

U.S. PATENT DOCUMENTS

| 5,263,097 A | * | 11/1993 | Katz | G01S 3/7865 382/190 |
| 5,274,714 A | * | 12/1993 | Hutcheson | G06K 9/00221 382/157 |

(Continued)

FOREIGN PATENT DOCUMENTS

| CN | 1343350 | 4/2002 |
| CN | 1819017 | 8/2006 |

(Continued)

OTHER PUBLICATIONS

Bhat et al., "Recognition of Dysarthric Speech Using Voice Parameters for Speaker Adaptation and Multi-taper Spectral Estimation", Interspeech 2016, Sep. 2016, pp. 228-232.

(Continued)

*Primary Examiner* — Michael C Colucci
(74) *Attorney, Agent, or Firm* — Tutunjian & Bitetto, P.C.; Vazken Alexanian

(57) ABSTRACT

A computer-implemented method is provided. The computer-implemented method is performed by a speech recognition system having at least a processor. The method includes estimating sound identification information from a neural network having periodic indications and components of a frequency spectrum of an audio signal data inputted thereto. The method further includes performing a speech recognition operation on the audio signal data to decode the audio signal data into a textual representation based on the estimated sound identification information. The neural network includes a plurality of fully-connected network layers having a first layer that includes a plurality of first nodes and a plurality of second nodes. The method further comprises (Continued)

training the neural network by initially isolating the periodic indications from the components of the frequency spectrum in the first layer by setting weights between the first nodes and a plurality of input nodes corresponding to the periodic indications to 0.

20 Claims, 12 Drawing Sheets

(51) Int. Cl.
*G10L 15/02* (2006.01)
*G10L 15/06* (2013.01)
*G10L 25/24* (2013.01)

(58) Field of Classification Search
USPC .................. 704/201, 232, 202; 706/15, 14
See application file for complete search history.

(56) References Cited

U.S. PATENT DOCUMENTS

| | | | | |
|---|---|---|---|---|
| 5,386,689 A * | 2/1995 | Bozich | ................. | G10K 11/178 381/71.11 |
| 5,467,428 A * | 11/1995 | Ulug | ..................... | G06N 20/00 706/25 |
| 5,680,627 A * | 10/1997 | Anglea | ................... | G06N 3/04 704/1 |
| 5,737,716 A * | 4/1998 | Bergstrom | .............. | G10L 19/02 704/202 |
| 5,761,383 A * | 6/1998 | Engel | ................. | G06K 9/00523 706/14 |
| 5,828,993 A * | 10/1998 | Kawauchi | ........... | G10L 19/0018 704/202 |
| 6,269,351 B1 * | 7/2001 | Black | ..................... | G06F 16/30 706/15 |
| 7,925,079 B1 * | 4/2011 | Mills | .................... | G06K 9/6217 382/159 |
| 9,715,508 B1 * | 7/2017 | Kish | ........................ | G06K 9/03 |
| 9,747,546 B2 * | 8/2017 | Ross | .................. | G06F 15/8046 |
| 9,747,548 B2 * | 8/2017 | Ross | ..................... | G06N 3/063 |
| 2006/0208169 A1 * | 9/2006 | Breed | ................... | B60N 2/002 250/221 |
| 2012/0041914 A1 * | 2/2012 | Tirunagari | ............ | G06F 12/121 706/15 |
| 2014/0288928 A1 * | 9/2014 | Penn | ..................... | G10L 15/16 704/232 |
| 2016/0240190 A1 | 8/2016 | Lee et al. | | |
| 2016/0275947 A1 * | 9/2016 | Li | ........................... | G10L 15/20 |
| 2017/0301347 A1 * | 10/2017 | Fuhrman | ................ | G10L 15/20 |

FOREIGN PATENT DOCUMENTS

CN 103366737 10/2013
WO WO2014145960 9/2014

OTHER PUBLICATIONS

International Search Report dated Apr. 16, 2018 for International Application No. PCT/IB2017/058001.
Adavanne, et al., "Sound Event Detection in Multichannel Audio Using Spatial and Harmonic Features", Detection and Classification of Acoustic Scenes and Events 2016, Sep. 2016, 5 pages.
Lee, et al., "A Useful Feature-Engineering Approach for a Lvcsr System Based on Cd-Dnn-Hmm Algorithm", European Signal Processing Conference, IEEE, 2015, Aug. 2015, pp. 1436-1440.
List of IBM Patents or Patent Applications Treated as Related dated May 30, 2018, 2 pages.

* cited by examiner $y_t(j)$ $C_t(i)$ $\hat{C}_t(i)$ $W_t(j)$ $w_t(j)$ $\hat{w}_t(d)$

SOUND IDENTIFICATION UTILIZING PERIODIC INDICATIONS

BACKGROUND

Technical Field

The present invention relates to estimation of sound identification based on periodic indications in the frequency spectrum of an audio signal.

Description of the Related Art

A number of conventional speech recognition systems use features processed by log-Mel or Mel-Frequency Cepstrum Coefficients (MFCC) as input features. Log-Mel and MFCC apply a Mel-filter bank to a frequency spectrum of the audio signal data. However, a Mel-filter bank does not preserve higher resolution information in the audio signal data. Typically, harmonic structures in human speech are lost through a Mel-filtering process. The harmonic structure provides information that may be used to discriminate vowels from other phonemes.

Meanwhile, current speech recognition systems are computationally expensive, and thus require lots of time or many computational resources. There is a need for integrating the harmonic structure into a speech recognition system in a way that may improve performance of the system.

SUMMARY

According to an aspect of the present invention, a computer-implemented method is provided. The computer-implemented method is performed by a speech recognition system having at least a processor. The method includes estimating, by the processor, sound identification information from a neural network having periodic indications and components of a frequency spectrum of an audio signal data inputted thereto. The method further includes performing, by the processor, a speech recognition operation on the audio signal data to decode the audio signal data into a textual representation based on the estimated sound identification information. The neural network includes a plurality of fully-connected network layers having a first layer that includes a plurality of first nodes and a plurality of second nodes. The method further comprises training the neural network by initially isolating the periodic indications from the components of the frequency spectrum in the first layer by setting weights between the first nodes and a plurality of input nodes corresponding to the periodic indications to 0.

According to another aspect of the present invention, a computer program product is provided. The computer program product has instructions embodied therewith. The instructions are executable by a speech recognition system that includes a processor or programmable circuitry to cause the processor or programmable circuitry to perform a method. The method includes estimating sound identification information from a neural network having periodic indications and components of a frequency spectrum of an audio signal data inputted thereto. The method further includes performing a speech recognition operation on the audio signal data to decode the audio signal data into a textual representation based on the estimated sound identification information. The neural network includes a plurality of fully-connected network layers having a first layer that includes a plurality of first nodes and a plurality of second nodes. The method further includes training the neural network by initially isolating the periodic indications from the components of the frequency spectrum in the first layer by setting weights between the first nodes and a plurality of input nodes corresponding to the periodic indications to 0.

According to yet another aspect of the present invention, a speech recognition system is provided. The speech recognition system includes a processor. The speech recognition system further includes one or more computer readable mediums collectively including instructions that, when executed by the processor, cause the processor to estimate sound identification information from a neural network having periodic indications and components of a frequency spectrum of an audio signal data inputted thereto, and perform a speech recognition operation on the audio signal data to decode the audio signal data into a textual representation based on the estimated sound identification information. The neural network is trained by initially isolating the periodic indications from the components of the frequency spectrum in the first layer by setting weights between the first nodes and a plurality of input nodes corresponding to the periodic indications to 0.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
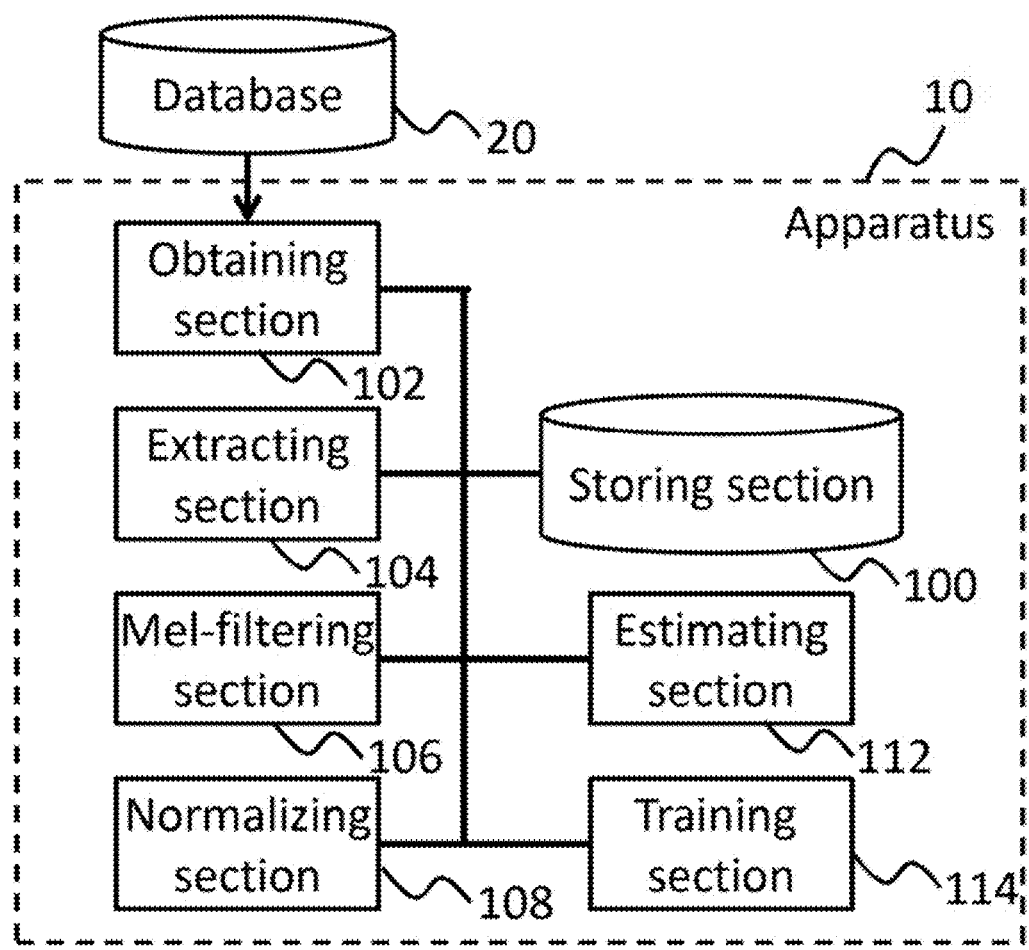
FIG. 1 shows an exemplary configuration of an apparatus 10, according to an embodiment of the present invention.

FIG. 1 shows an exemplary configuration of an apparatus 10 (e.g., a computer, programmable circuitry, etc.), according to an embodiment of the present invention. The apparatus 10 may estimate sound identification information based on audio signal data. In an embodiment, the sound identification information may be phoneme information.

The apparatus 10 may comprise a processor and one or more computer readable mediums collectively including instructions. The instructions, when executed by the processor or programmable circuitry, may cause the processor or the programmable circuitry to operate as a plurality of operating sections. Thereby, the apparatus 10 may be represented as a storing section 100, an obtaining section 102, an Extracting section 104, a Mel-filtering section 106, a normalizing section 108, an estimating section 112, and a training section 114.

The storing section 100 may store a variety of data used for operations of the apparatus 10. The storing section 100 may comprise a volatile or non-volatile memory. One or more other elements in the apparatus 10 (e.g., the obtaining section 102, the extracting section 104, the Mel-filtering section 106, the normalizing section 108, the estimating section 112, and the training section 114, etc.) may communicate directly or indirectly via the storing section 100.

The obtaining section 102 may obtain a frequency spectrum of audio signal data. The obtaining section 102 may also obtain training data for training a neural network. The training data may comprise one or more sets of audio signal data and correct sound identification information corresponding to the respective set of audio signal data.

The extracting section 104 may extract periodic indications from the frequency spectrum. The periodic indications may represent fluctuations in the frequency spectrum that periodically appear in a frequency direction of the frequency spectrum. In an embodiment, the periodic indications may represent a harmonic structure of the audio signal data. Details of the extraction of the periodic indications are explained below.

The Mel-filtering section 106 may perform a Mel-filtering process. The Mel-filtering section 106 may Mel-filter the periodic indications. The Mel-filtering section 106 may also log-Mel-filter the frequency spectrum. Details of the Mel-filtering processes are explained below.

The normalizing section 108 may perform normalization. The normalizing section 108 may normalize the Mel-filtered periodic indications. The normalizing section 108 may also normalize the log-Mel-filtered frequency spectrum. Details of the normalization process are explained below.

The estimating section 112 may direct the processing of a neural network. In an embodiment, the estimating section 112 may input the periodic indications and components of the frequency spectrum into a neural network. The components of the frequency spectrum may include values relating to power and/or strength of the audio signal data in a plurality of frequency bands in the frequency spectrum. In an embodiment, the components of the frequency spectrum may be the normalized Mel-filtered frequency spectrum of the audio signal data. In an alternative embodiment, the components of the frequency spectrum may include the Mel-filtered or normalized frequency spectrum of the audio signal data, or the frequency spectrum itself.

The estimating section 112 may perform a calculation of the neural network and estimate sound identification information from the neural network. In an embodiment, the estimating section 112 may identify phoneme information as the sound identification information. Details of the calculation of the neural network are explained below.

The training section 114 may perform training of the neural network using the training data.

As described above, the apparatus 10 may estimate sound identification information from the neural network, into which the periodic indications and the components of the frequency spectrum are input. The apparatus 10 may improve accuracy of estimation of the sound identification information based on both normalized Mel-filtered periodic indications and the frequency spectrum.

Figure 2:
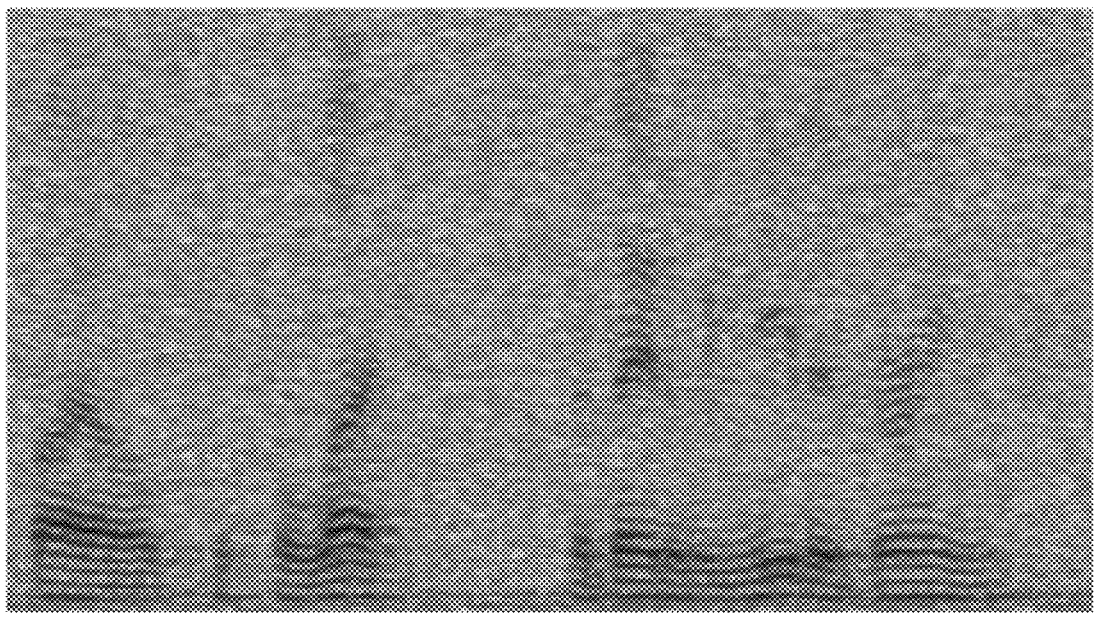
FIG. 2 shows a spectrogram of an observed spectrum in audio signal according to an embodiment of the present invention.

FIG. 2 shows a spectrogram of an observed spectrum in audio signal data according to an embodiment of the present invention. The horizontal axis in FIG. 2 corresponds to time, the vertical axis corresponds to frequency, and the shade corresponds to power of the audio signal data. In FIG. 2, horizontal dark stripes can be observed repeating along the vertical axis, denoting sharp fluctuations in strength across the frequency bands of the frequency spectrum. The stripes may correspond to periodic indications of the audio signal data. A group of periodic indications may represent a harmonic structure. The audio signal data may often include such periodic indications due to vocal cord vibration, and the apparatus may utilize the periodic indications to identify the phoneme expressed in the audio signal data. In particular, the apparatus may extract the periodic indications from the audio signal data and may identify a specific phoneme expressed in the audio signal data, even if recorded in a noisy environment.

Figure 3:
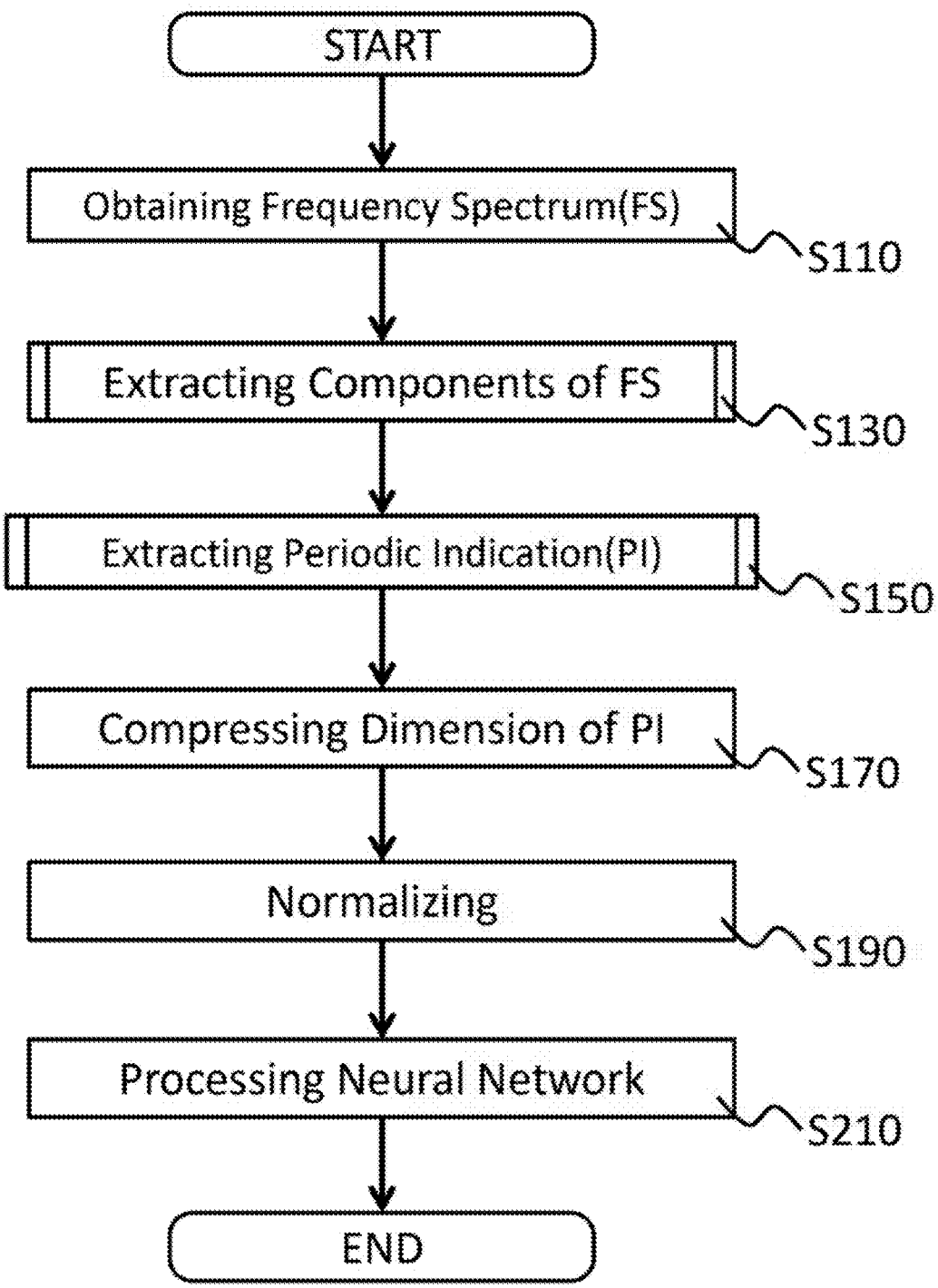
FIG. 3 shows an operational flow according to an embodiment of the present invention.

FIG. 3 shows an operational flow according to an embodiment of the present invention. The present embodiment describes an example in which an apparatus, such as the apparatus 10, performs the operations from S110 to S210, as shown in FIG. 3. The apparatus may estimate the sound identification information by performing the operations S110-S210.

At S110, an obtaining section, such as the obtaining section 102, may obtain a frequency spectrum of an audio signal data. In an embodiment, the obtaining section may obtain a frequency spectrum represented by a power spectral density. In an embodiment, the audio signal data may be coded into spectrums over a plurality of time frames, and the obtaining section may obtain a plurality of frequency spectrums for a plurality of time frames of the audio signal data.

For example, the audio signal data may be conversational speech recorded at 8 kHz. The time frames of the audio signal data may each have a 20 ms frame size with a 10 ms frame shift. The apparatus 10 may perform the operations of FIG. 3 for the frequency spectrum of each time frame.

In an embodiment, the frequency spectrum is represented by $y_t(j)$, where $t$ (=1 ... T) represents a time frame number of the audio signal data having T time frames, and $j$ (=1 ... J) represents a frequency bin number corresponding to each frequency band in the frequency spectrum. In an embodiment, the number of bins J may be typically but not limited to 256 or 512.

At S130, the apparatus may obtain components of the frequency spectrum from the frequency spectrum of the audio signal data.

Figure 4:
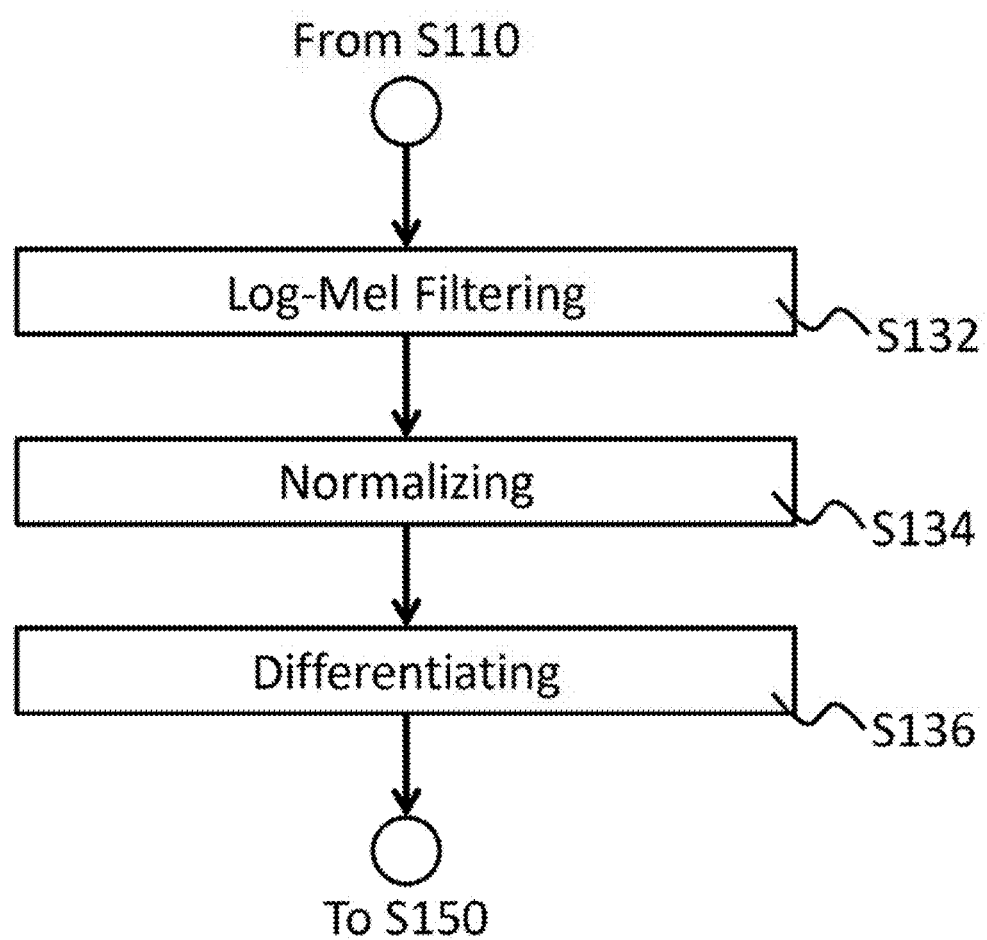
FIG. 4 shows an operational sub-flow corresponding to S130 according to an embodiment of the present invention.

FIG. 4 shows an operational sub-flow corresponding to S130 according to an embodiment of the present invention. The apparatus may perform operations S132 and S136 of FIG. 4 at the operation S130 of FIG. 3.

At S132, a Mel-filtering section, such as the Mel-filtering section 106, may log-Mel filter the frequency spectrum of the audio signal data obtained at S110. In an embodiment, the Mel-filtering section may first calculate:

$$\hat{S}_t(d) = \Sigma_j y_t(j) \cdot B(d,j) \quad (1)$$

to Mel-filter the frequency spectrum $y_t(j)$. Then, the Mel-filtering section may calculate: $\hat{s}_t(d) = \log(\hat{S}_t(d))$ to obtain a log-Mel-filtered frequency spectrum $\hat{s}_t(d)$, where $B(d,j)$ represents a Mel-filter bank and is the d-th (d=1 ... D) triangle filter for the j-th bin, log (*) may represent natural logarithm or common logarithm, and D represents the number of dimensions of the Mel-filter bank, and may be selected from 13-80.

In an alternative embodiment, the estimating section may calculate MFCC from the frequency spectrum $y_t(j)$ and use the calculated MFCC as $\hat{s}_t(d)$.

At S134, a normalizing section, such as the normalizing section 108, may normalize the frequency spectrum processed at S132. The normalizing section may adopt mean and variance normalization or other types of normalization. In an embodiment, the normalizing section may calculate:

$$\gamma_t(d) = (\hat{s}_t(d) - \bar{s}(d))/\sqrt{\hat{v}(d)} \quad (2)$$

to obtain normalized a log-Mel-filtered frequency spectrum $\gamma_t(d)$, where $\bar{s}(d)$ represents a mean value of log-Mel-filtered frequency spectrum of at least a part of training data, and $\hat{v}(d)$ represents a variance of the log-Mel-filtered frequency spectrum of the at least a part of training data. In an embodiment, the at least a part of training data may be one or more utterance units of audio signal data in the training data.

In an embodiment, $y_t(j)$, $Y_t(j)$, $\hat{s}_t(d)$, and/or $\gamma_t(d)$ may include values relating to powers of the audio signal data in a plurality of frequency bands "d" and "j" in the frequency spectrum, and may be treated as the components of the frequency spectrum.

At S136, the estimating section may differentiate the frequency spectrum processed at S134 with respect to time. In an embodiment, the estimating section may calculate a first derivation $\Delta\gamma_t(d)$ of $\gamma_t(d)$. In an embodiment, the estimating section may further calculate a second derivation $\Delta\Delta\gamma_t(d)$ of $\gamma_t(d)$.

According to the operations of S132-136, the estimating section may obtain the components of the frequency spectrum that may include values relating to powers of the audio signal data in a plurality of frequency bands in the frequency spectrum. The estimating section may further obtain the first derivation and the second derivation with respect to time of the components of the frequency spectrum such as $\Delta\gamma_t(d)$ and $\Delta\Delta\gamma_t(d)$.

After the operation of S130 of FIG. 3, an extracting section such as the extracting section 104 may extract the periodic indications from the frequency spectrum.

Figure 5:
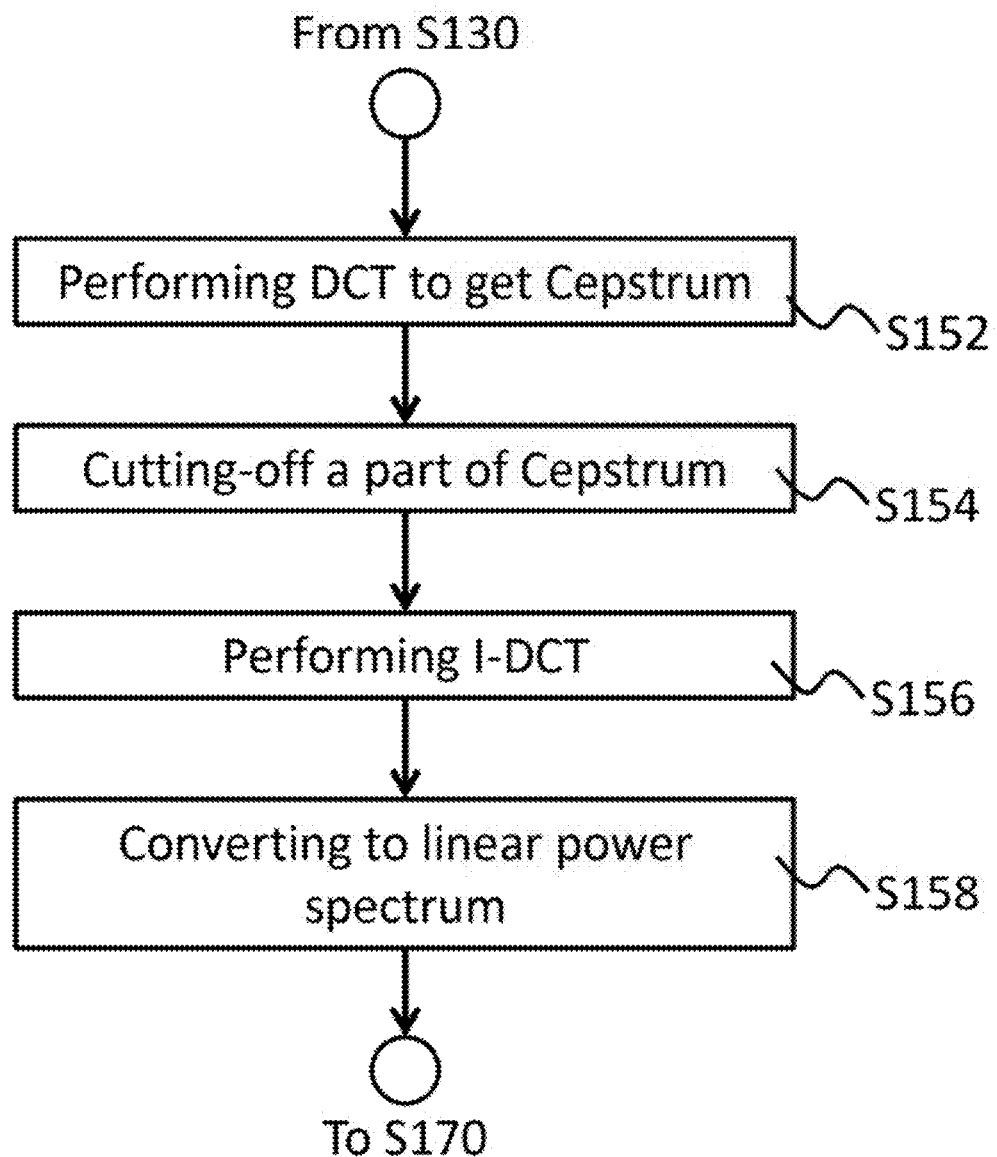
FIG. 5 shows an operational sub-flow corresponding to S150 according to an embodiment of the present invention.

FIG. 5 shows an operational sub-flow corresponding to S150 according to an embodiment of the present invention. The apparatus may perform operations S152 and S158 of FIG. 5 at the operation S150 of FIG. 3.

At S152, the extracting section may obtain a Cepstrum by performing a Discrete Cosine Transformation on the log power spectrum $Y_t(j)$.

Figure 6:
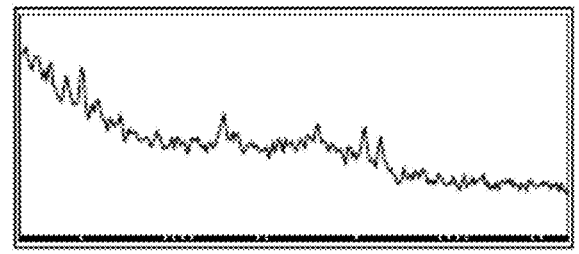
FIG. 6 shows log power spectrum according to an embodiment of the present invention.

FIG. 6 shows a power spectrum for a single time frame in the frequency spectrum, according to an embodiment of the present invention. The horizontal axis in FIG. 6 represents frequency and the vertical axis represents log power.

In an embodiment, the extracting section may calculate:

$$C_t(i) = \Sigma_j D(i,j) \cdot y_t(j) \quad (3)$$

to obtain the cepstrum $C_t(i)$, where $D(i,j)$ is a DCT matrix.

Figure 7:
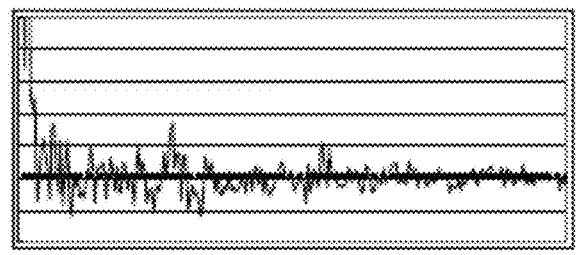
FIG. 7 shows cepstrum according to an embodiment of the present invention.

FIG. 7 shows a cepstrum according to an embodiment of the present invention. The horizontal axis in FIG. 7 represents frequency and the vertical axis represents log power. The extracting section may obtain the cepstrum of FIG. 7 from the log power spectrum of FIG. 6.

At S154, the extracting section may cut off a part of the cepstrum $C_t(i)$. In an embodiment, the extracting section may filter out an upper part and/or a lower part of the $C_t(i)$. In the embodiment, the extracting section may calculate:

$$\hat{C}_t(i) = \varepsilon C_t(i) \text{ if } (i<C_L) \text{ or } (i>C_U) \quad (4)$$

$$\hat{C}_t(i) = C_t(i) \text{ otherwise} \quad (5)$$

where $\varepsilon$ represents a very small constant (e.g., 0.001) or 0, $C_L$ represents a lower cut-off number, and $C_U$ represents an upper cut-off number. Thereby, the extracting section may choose a range of cepstrum between $C_L$ and $C_U$ as a cut-off cepstrum $\hat{C}_t(i)$.

Figure 8:
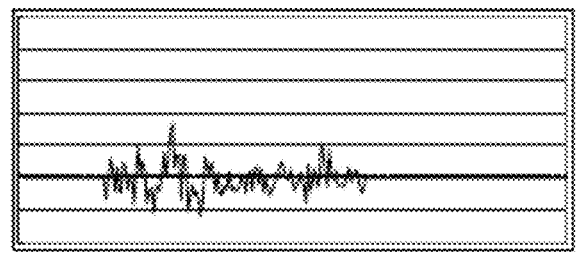
FIG. 8 shows cut-off cepstrum according to an embodiment of the present invention.

FIG. 8 shows a cut-off cepstrum according to an embodiment of the present invention. The horizontal axis and the vertical axis of FIG. 8 represent the same units as FIG. 7. The extracting section may obtain the cut-off cepstrum of FIG. 8 from the cepstrum of FIG. 7.

At S156, the extracting section may convert the cut-off cepstrum back to a log power spectrum by performing inverse-DCT (I-DCT). In an embodiment, the extracting section may calculate:

$$W_t(j) = \Sigma_i D^{-1}(j,i) \cdot \hat{C}_t(i) \quad (6)$$

to obtain an I-DCT spectrum $W_t(j)$.

Figure 9:
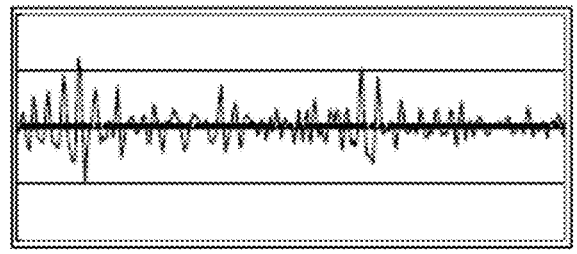
FIG. 9 shows I-DCT spectrum according to an embodiment of the present invention.

FIG. 9 shows an I-DCT spectrum according to an embodiment of the present invention. The horizontal axis in FIG. 9 represents frequency and the vertical axis represents log power. The extracting section may obtain the I-DCT spectrum of FIG. 9 from the cut-off cepstrum of FIG. 8.

At S158, the extracting section may convert the I-DCT spectrum (i.e., log power spectrum) to a linear power spectrum. In an embodiment, the extracting section may calculate:

$$w_t(j) = \exp(W_t(j)) \quad (7)$$

to obtain $w_t(j)$, which is represented in the linear power spectrum domain. The apparatus may use $w_t(j)$ for a plurality of bins j, as the periodic indications.

Figure 10:
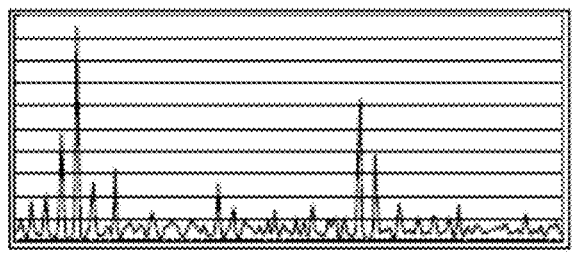
FIG. 10 shows periodic indications according to an embodiment of the present invention.

FIG. 10 shows periodic indications according to an embodiment of the present invention. A horizontal axis represents frequency and the vertical axis represents linear power in FIG. 10. The extracting section may obtain the linear spectrum of FIG. 10 from the log power spectrum of FIG. 9.

After the operation of S150 of FIG. 3, the Mel-filtering section may compress the periodic indications by reducing a number of dimensions of the periodic indications. In an embodiment, the Mel-filtering section may Mel-filter the periodic indications to reduce the number of dimensions by calculating:

$$\hat{w}_t(d) = \Sigma_j w_t(j) \cdot B(d,j)/\Sigma_j B(d,j') \quad (8)$$

to obtain Mel-filtered periodic indications $\hat{w}_t(d)$, where $B(d,j)$ represents a Mel-filter bank and is the d-th (d=1 ... D) triangle filter for the j-th bin.

Figure 11:
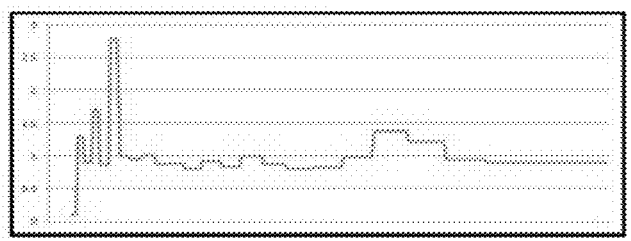
FIG. 11 shows Mel-filtered periodic indications according to an embodiment of the present invention.

FIG. 11 shows Mel-filtered periodic indications according to an embodiment of the present invention. The horizontal axis represents frequency and the vertical axis represents linear power in FIG. 11. The Mel-filtering section may obtain the Mel-filtered periodic indications of FIG. 11 from the periodic indications of FIG. 10.

As shown in FIG. 11, the Mel-filtering section may compress the periodic indications by reducing a number of dimensions of the periodic indications, especially in a high frequency range. Thereby, relatively important information of the periodic indications may be preserved after the compression. In an embodiment, the number D may be selected from 20-40.

At S190, the normalizing section may normalize the Mel-filtered periodic indications. In an embodiment, the normalizing section may perform the normalization so as to maintain an ordinal scale among a plurality of bands in the periodic indications. Thereby, the normalizing section may preserve information of the ordinal scale of the periodic indications, which may be beneficial for the estimation of a neural network. In an example, the normalizing section may perform the normalization based on sigmoid normalization. In the example, the normalizing section may calculate:

$$\beta_t(d)=1.0/(1.0+\exp(-a\cdot(\hat{w}_t(d)-1.0-b))) \qquad (9)$$

to obtain the normalized Mel-filtered periodic indications $\beta_t(d)$, where a and b are constant values.

In another example, the normalizing section may perform the normalization based on max-variance normalization. In the example, the normalizing section may calculate:

$$\beta_t(d) = (\alpha_t(d) - \overline{\alpha}(d))/\sqrt{\hat{x}_{max}} \qquad (10)$$

where $$\alpha_t(d) = \log(\hat{w}_t(d) + \varepsilon) \qquad (11)$$

$$\overline{\alpha}(d) = E[\alpha(d)] \qquad (12)$$

$$\alpha(d) = \log(\hat{w}(d) + \mu) \qquad (13)$$

$$\hat{x}_{max} = \max_d(\hat{x}(d)) \qquad (14)$$

$$\hat{x}(d) = E[(\alpha(d) - \overline{\alpha}(d))^2] \qquad (15)$$

μ represents a constant value, E[ ] represents a function calculating an expectation, and $\hat{w}(d)$ represents a Mel-filtered periodic indications obtained by the training data. In an embodiment, the normalizing section may preliminarily calculate the formulae (12)-(15) by utilizing audio signal data of the training data before starting the operations in FIG. 3, and may store the result of calculation of (12)-(15).

At S210, an estimating section, such as the estimating section 112, may estimate a sound identification information, such as phoneme information, by processing a calculation of a neural network. The estimating section may input the compressed normalized periodic indications obtained at S190 and the components of the frequency spectrum obtained at S134 into the neural network. The estimating section may further input the first and second derivation of the components of the frequency spectrum into the neural network obtained at S136.

In an embodiment, the neural network used by the estimating section may be a convolutional neural network or a deep neural network. The convolutional neural network may include one or more convolutional neural network layers, which may comprise one or more sets of convolutional layers and pooling layers. The convolutional neural network may also include one or more fully-connected layers. The convolutional neural network may further include other types of layers. The deep neural network may include a plurality of fully-connected layers, and may optionally include other types of layers.

As explained above in relation to FIG. 3, the apparatus may extract the periodic indications, and input the periodic indications with the components of the frequency spectrum into the neural network to estimate the sound identification information. Since the apparatus may use not only the components of the frequency spectrum but also the periodic indications, which may indicate confidence of the existence of human voice, the apparatus may improve accuracy of identification of the sound identification information.

In addition, in some embodiments, since the periodic indications and the frequency spectrum may be compressed (e.g., Mel-filtered) by reducing a number of dimensions of the periodic indications before being inputting into the neural network, the computational resources needed for the estimation of the sound identification information may be reduced.

Furthermore, since the periodic indications may be normalized so as to maintain an ordinal scale among a plurality of bands in the periodic indications, the periodic indications may be properly processed with the components of the frequency spectrum without losing information of an ordinal scale of the periodic indications among frequency bands.

In some embodiments, the apparatus may not normalize the periodic indications and the frequency spectrum. In these embodiments, the apparatus may not perform S134 and S190. In some embodiments, the apparatus may not Mel-filter the periodic indications and the frequency spectrum. In these embodiments, the Mel-filtering section may only calculate log($y_t$(j)) without Mel-filtering process at S132 and the apparatus may not perform S210.

Figure 12:
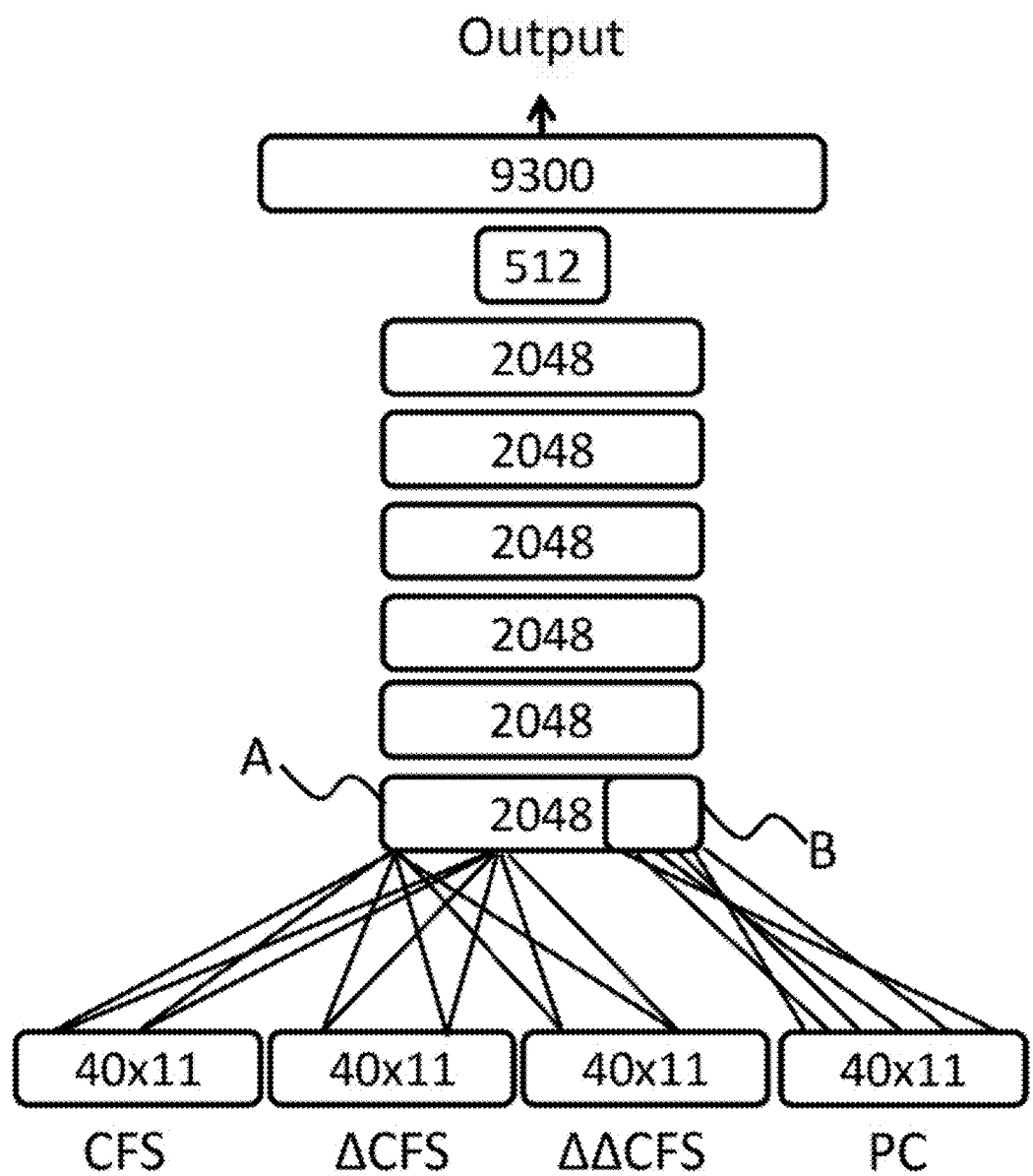
FIG. 12 shows a deep neural network according to an embodiment of the present invention.

FIG. 12 shows a deep neural network according to an embodiment of the present invention. In an embodiment, the estimating section may use the neural network shown in FIG. 12 at the operation S210 of FIG. 3.

In the embodiment, the neural network may include six 2048-node layers, a 512-node layer, and a 9300-node layer, which may be fully-connected layers. The neural network may input the periodic indications, and, the components of the frequency spectrum into a first layer of the neural network. In the embodiment of FIG. 12, the neural network may include four 40×11 input nodes, where each 40×11 input nodes input the component of frequency spectrum (CFS, ΔCFS, ΔΔCFS, and the periodic indications (PI) into the first 2048-node layer.

40×11 means 40 dimensional features by 11 time frames. In an embodiment, CFS may correspond to the normalized log-Mel-filtered frequency spectrum $\gamma_t(d)$ (1≤d≤D, $t_c$−5≤t≤$t_c$+5 where D=40 and $t_c$ is a current time frame) obtained at S134. Thereby, the neural network may input the features of 11 time frames that center the current time frame $t_c$ and include 5 time frames before and after $t_c$.

ΔCFS and ΔΔCFS may correspond to the first derivation of CFS Δ$\gamma_t(d)$ and the second derivation of CFS ΔΔ$\gamma_t(d)$ obtained at S136. PI may correspond to the normalized Mel-filtered periodic indications $\beta_t(d)$ obtained at S190. The neural network may input CFS ($\gamma_t(d)$), ΔCFS (Δ$\gamma_t(d)$), ΔΔCFS (ΔΔ$\gamma_t(d)$) and PI($\beta_t(d)$) for each time frame t of the audio signal data.

In the embodiment of FIG. 12, the first 2048-node layer includes a plurality of first nodes and a plurality of second nodes. A portion corresponding to the first nodes is represented as A and a portion corresponding to the second nodes is represented as B in FIG. 12. Before starting the training of the neural network, a training section, such as the training section 114, may set weights between the first nodes A and a plurality of input nodes corresponding to PI to 0, weights between the second nodes B and a plurality of input nodes corresponding to CFS, ΔCFS and ΔΔCFS to 0. The training section may set other weights between the nodes in the first 2048-node layer and the input nodes to predetermined constant value(s) or random values. Thereby, at the beginning of the training, the periodic indications (PI) and standard features such as CFS, ΔCFS and ΔΔCFS are isolated in the first 2048-node layer.

This technique may be referred to as block initialization, and may enable independent processing of the periodic indications at least at the beginning of the training. The standard features and the periodic indications may be regarded as different types of information, and thus it may be preferable to avoid integration of these features at the very first layers of the neural network in some cases.

According to the block initialization, the periodic indications and the standard features may substantially be integrated after middle layers of the neural network. Thereby, the estimating section may integrate the periodic indications and the standard features in the neural network after abstracting the periodic indications and the standard features, and thus may improve the performance of the neural network.

In the embodiment, the neural network may output the sound identification information $S_t$ for each time frame t from the 9300-node layer. The number "9300" corresponds to the number of phonemes, and each of the 9300 nodes in the 9300-node layer corresponds to each of the existent 9300 phonemes. While nodes in the last layer of the neural network may correspond to phonemes, the number of nodes in the last layer is not limited to 9300. In some embodiments, the nodes in the last layer of the neural network may correspond to sequential combinations of two or more phonemes.

In an embodiment, only one node in the 9300-node layer may output 1, and other nodes in the 9300-nodes layer may output 0, meaning that a phoneme corresponding to the one node is identified as the sound identification information output from the neural network. In another embodiment, each node in the 9300-nodes layer may output a value corresponding to a possibility that a phoneme corresponding to that node is identified from the audio signal data.

Figure 13:
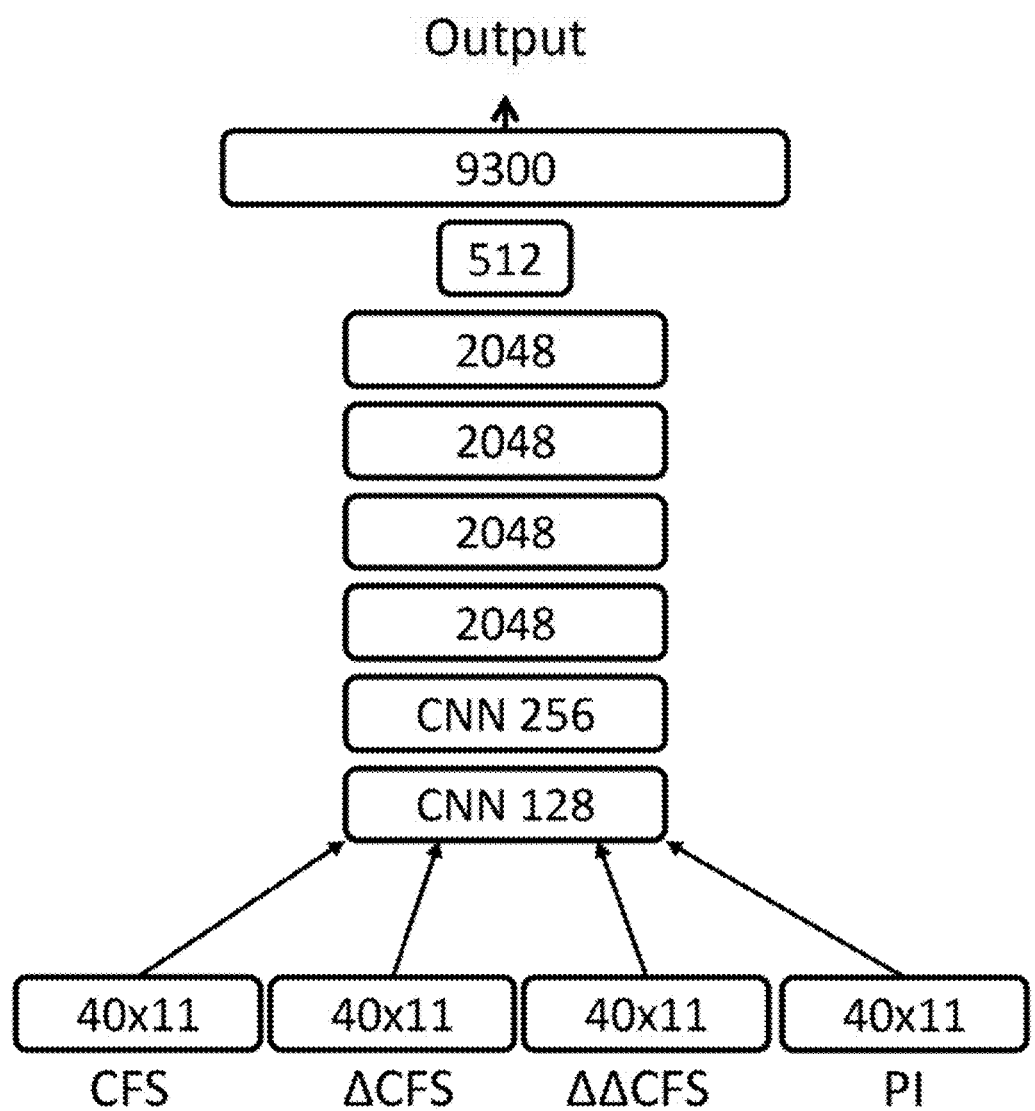
FIG. 13 shows a convolutional neural network according to an embodiment of the present invention.

FIG. 13 shows a convolutional neural network according to an embodiment of the present invention. In an embodiment, the estimating section may use the neural network shown in FIG. 13 at the operation S210. Here, only the differences between the neural networks of FIG. 12 and FIG. 13 may be explained.

In the embodiment, the neural network may include a 128-node convolutional neural network (CNN) layer, a 256-node CNN layer, four 2048-node layers, a 512-node layer, and a 9300-node layer. The four 2048-node layers, the 512-node layer, and the 9300-node layer may be fully-connected layers. The neural network may input the periodic indications and the components of the frequency spectrum into a first layer (i.e., the 128-node CNN layer) of the neural network.

Figure 14:
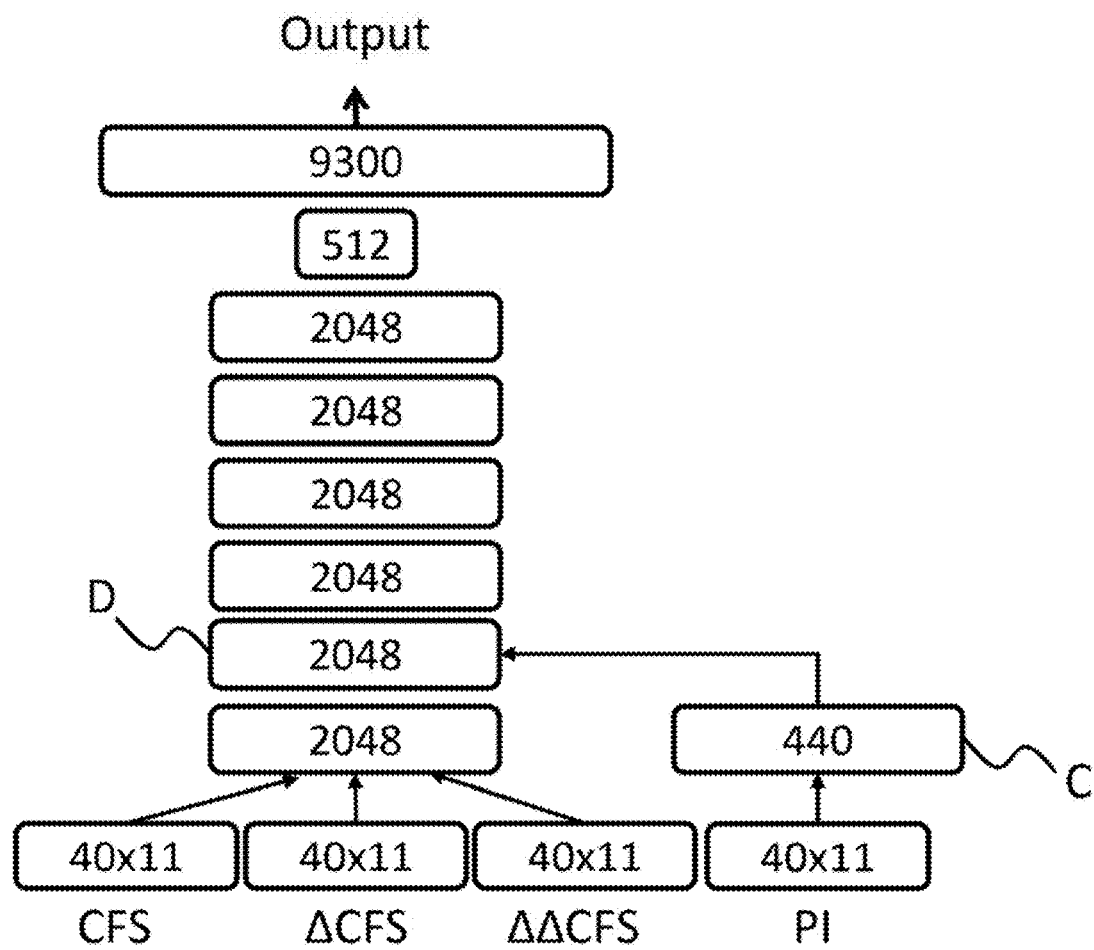
FIG. 14 shows a deep neural network according to an embodiment of the present invention.

FIG. 14 shows a deep neural network according to an embodiment of the present invention. In an embodiment, the estimating section may use the neural network shown in FIG. 14 at the operation S210. Here, only the differences between the neural networks of FIG. 12 and FIG. 14 may be explained.

In an embodiment, the neural network may input the periodic indications into a second layer or a subsequent layer of the neural network. In the embodiment of FIG. 14, the standard features (CFS, ΔCFS and ΔΔCFS) may be input into a first 2048-node layer, and the periodic indications (PI) may be input into a 440-node layer, which is isolated from the first 2048-node layer and represented as C in FIG. 14. A second 2048-node layer represented as D may input both outputs from the first 2048-node layer and the 440 node layer.

According to the embodiment of FIG. 14, the periodic indications and the standard features may be integrated at the second 2048-node layer of the neural network. Thereby, the estimating section may integrate the periodic indications and the standard features in the neural network after abstracting the periodic indications and the standard features at the first 2048-node layer, and thus may improve the performance of the neural network.

Figure 15:
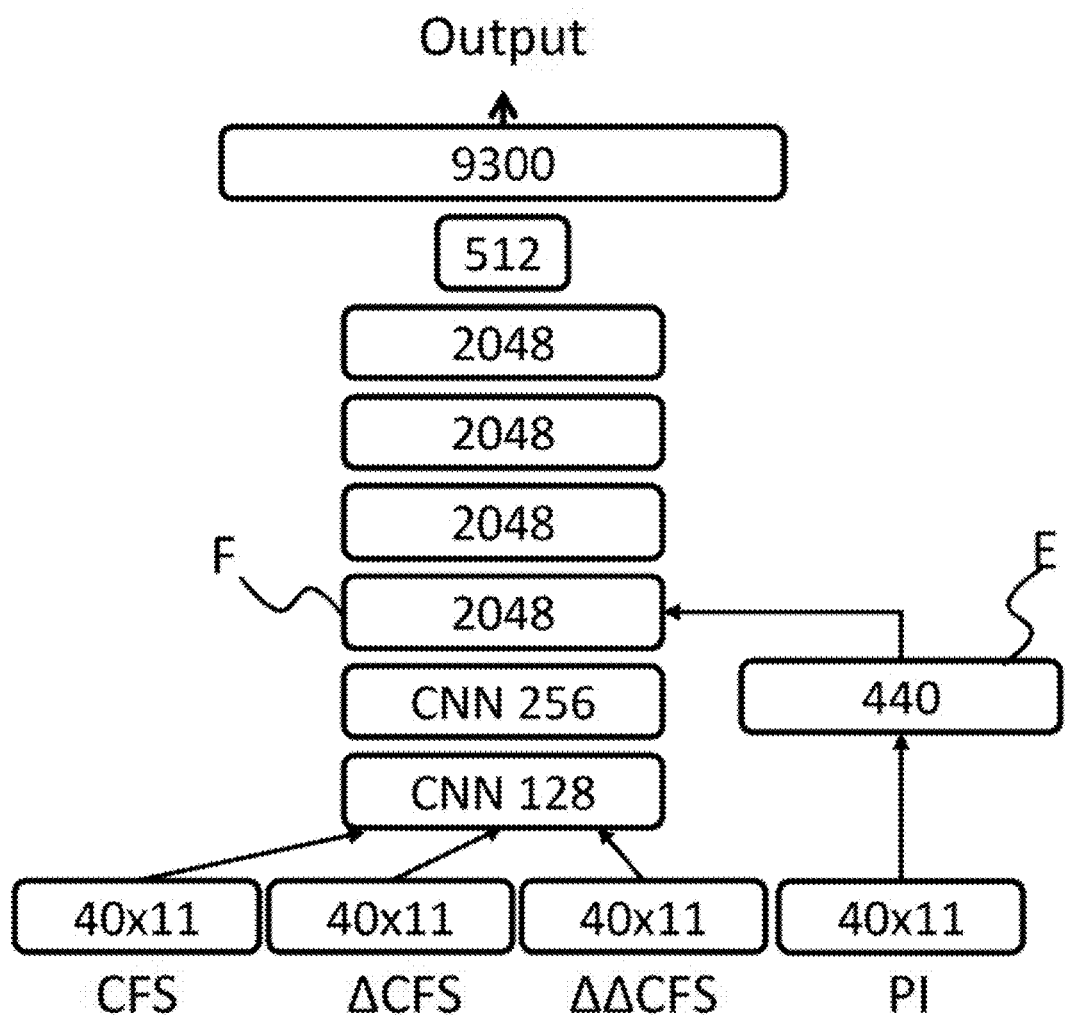
FIG. 15 shows a convolutional neural network according to an embodiment of the present invention.

FIG. 15 shows a convolutional neural network according to an embodiment of the present invention. In an embodiment, the estimating section may use the neural network shown in FIG. 15 at the operation S210. Here, only the differences between the neural networks of FIG. 13 and FIG. 15 may be explained.

In an embodiment, the neural network may input the periodic indications into a layer that is downstream of the one or more convolutional neural network layers. In the embodiment of FIG. 15, the standard features (CFS, ΔCFS and ΔΔCFS) may be input into a first CNN layer (i.e., the 128-node CNN layer), and the periodic indications (PI) may be input into a 440-node layer represented as E in FIG. 15. The first CNN layer may be connected to a second CNN layer (i.e., the 256-node CNN layer), and the second CNN layer may be connected to a first 2048-node layer represented as F in FIG. 15. The 440-node layer may be fully connected to the first 2048-node layer.

According to the embodiment, information derived from the standard features and information derived from the periodic indications may converge after the CNN layers. The periodic indications may be mixed with the standard features after the standard features are abstracted by the CNN layers, thereby improving the performance of the neural network.

In the embodiments of FIG. 14 and FIG. 15, the apparatus may not Mel-filter the periodic indications before inputting the periodic indications into the neural network. Since the periodic indications are not input into a first layer of the neural network in parallel with the standard features in these embodiments, the dimension number of the periodic indications may be reduced by another method other than Mel-filtering. In an embodiment, the periodic indications may even be input into the neural network without reducing the number of dimensions. For similar reasons, the apparatus may not normalize the periodic indications before inputting the periodic indications into the neural network in the embodiments of FIG. 14 and FIG. 15.

In some embodiments, the Mel-filtering may be performed after the normalization. For example, in these embodiments, the apparatus may perform the operation S190 after the operation S210, and perform the operation S134 after the operation S132.

Figure 16:
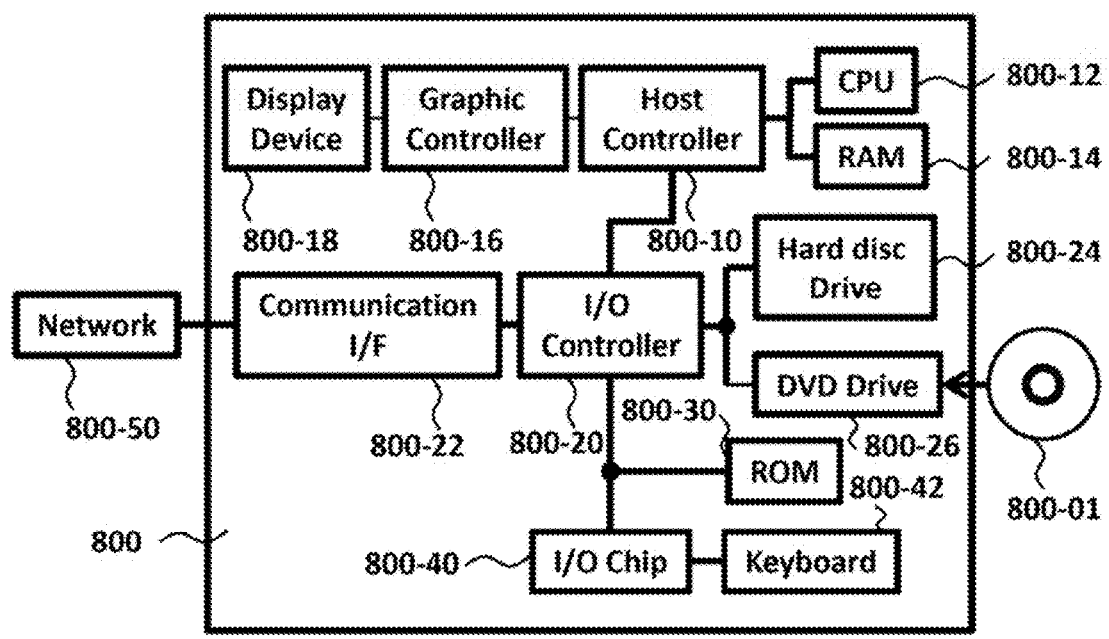
FIG. 16 shows an exemplary hardware configuration of a computer 800 that functions as a system, according to an embodiment of the present invention.

FIG. 16 shows an exemplary hardware configuration of a computer configured for cloud service utilization, according to an embodiment of the present invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14.

In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention enable a learning apparatus learning a model corresponding to time-series input data to have higher expressive ability and learning ability and to perform the learning operation more simply.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method performed by a speech recognition system having at least a processor, the method comprising:
   estimating, by the processor, sound identification information from a neural network having periodic indications and components of a frequency spectrum of an audio signal data inputted thereto; and
   performing, by the processor, a speech recognition operation on the audio signal data to decode the audio signal data into a textual representation based on the estimated sound identification information,
   wherein the neural network includes a plurality of fully-connected network layers having a first layer that includes a plurality of first nodes and a plurality of second nodes, and wherein the method further comprises training the neural network by initially isolating the periodic indications from the components of the frequency spectrum in the first layer by setting weights between the first nodes and a plurality of input nodes corresponding to the periodic indications to 0.

2. The computer-implemented method of claim 1, wherein the estimating sound identification includes identifying phoneme information.

3. The computer-implemented method of claim 1, wherein the periodic indications represent fluctuations in the frequency spectrum that periodically appear in the frequency spectrum.

4. The computer-implemented method of claim 1, wherein the periodic indications represent harmonic structure of the audio signal data.

5. The computer-implemented method of claim 1, further comprising normalizing the periodic indications before the inputting into the neural network.

6. The computer-implemented method of claim 5, wherein the normalizing the periodic indications includes maintaining an ordinal scale among a plurality of bands in the periodic indications.

7. The computer-implemented method of claim 6, wherein the normalizing the periodic indications is based on sigmoid normalization or max-variance normalization.

8. The computer-implemented method of claim 1, wherein the components of the frequency spectrum include values relating to powers of the audio signal data in a plurality of frequency bands in the frequency spectrum.

9. The computer-implemented method of claim 8, wherein the periodic indications and the components of the frequency spectrum are inputted into the neural network by inputting a first derivation and a second derivation with respect to time of the values relating to powers of the audio signal data in the plurality of frequency bands in the frequency spectrum.

10. The computer-implemented method of claim 1, wherein the neural network is a convolutional neural network or a deep neural network.

11. The computer-implemented method of claim 10, wherein the periodic indications and the components of the frequency spectrum are input into a first layer of the neural network.

12. The computer-implemented method of claim 10, further comprising Mel-filtering the periodic indications and the frequency spectrum before the inputting into the neural network.

13. The computer-implemented method of claim 10, wherein the periodic indications are inputted into a second layer or a subsequent layer of the neural network.

14. The computer-implemented method of claim 13, wherein the neural network is the convolutional neural network, and the convolutional neural network includes one or more convolutional neural network layers, and
   wherein the periodic indications are inputted into a layer that is downstream of the one or more convolutional neural network layers.

15. The computer-implemented method of claim 13, further comprising compressing the periodic indications by reducing a number of dimensions of the periodic indications before the inputting of the periodic indications into the neural network.

16. The computer-implemented method of claim 13, further comprising Mel-filtering the periodic indications before the periodic indications are inputted into the neural network.

17. A non-transitory computer program product having instructions embodied therewith, the instructions executable by a speech recognition system that includes a processor or programmable circuitry to cause the processor or programmable circuitry to perform a method comprising:
   estimating sound identification information from a neural network having periodic indications and components of a frequency spectrum of an audio signal data inputted thereto; and
   performing a speech recognition operation on the audio signal data to decode the audio signal data into a textual representation based on the estimated sound identification information,
   wherein the neural network includes a plurality of fully-connected network layers having a first layer that includes a plurality of first nodes and a plurality of second nodes, and wherein the method further comprises training the neural network by initially isolating the periodic indications from the components of the frequency spectrum in the first layer by setting weights between the first nodes and a plurality of input nodes corresponding to the periodic indications to 0.

18. The non-transitory computer program product of claim 17, wherein the estimating sound identification includes identifying phoneme information.

19. The non-transitory computer program product of claim 17, wherein the periodic indications represent fluctuations in the frequency spectrum that periodically appear in the frequency spectrum.

20. A speech recognition system, comprising:
 a processor; and
 one or more computer readable mediums collectively including instructions that, when executed by the processor, cause the processor to:
  estimate sound identification information from a neural network having periodic indications and components of a frequency spectrum of an audio signal data inputted thereto; and
  perform a speech recognition operation on the audio signal data to decode the audio signal data into a textual representation based on the estimated sound identification information,
 wherein the neural network is trained by initially isolating the periodic indications from the components of the frequency spectrum in the first layer by setting weights between the first nodes and a plurality of input nodes corresponding to the periodic indications to 0.

\* \* \* \* \*